INVENTORS.
Rolland M. Waters
John M. Lee

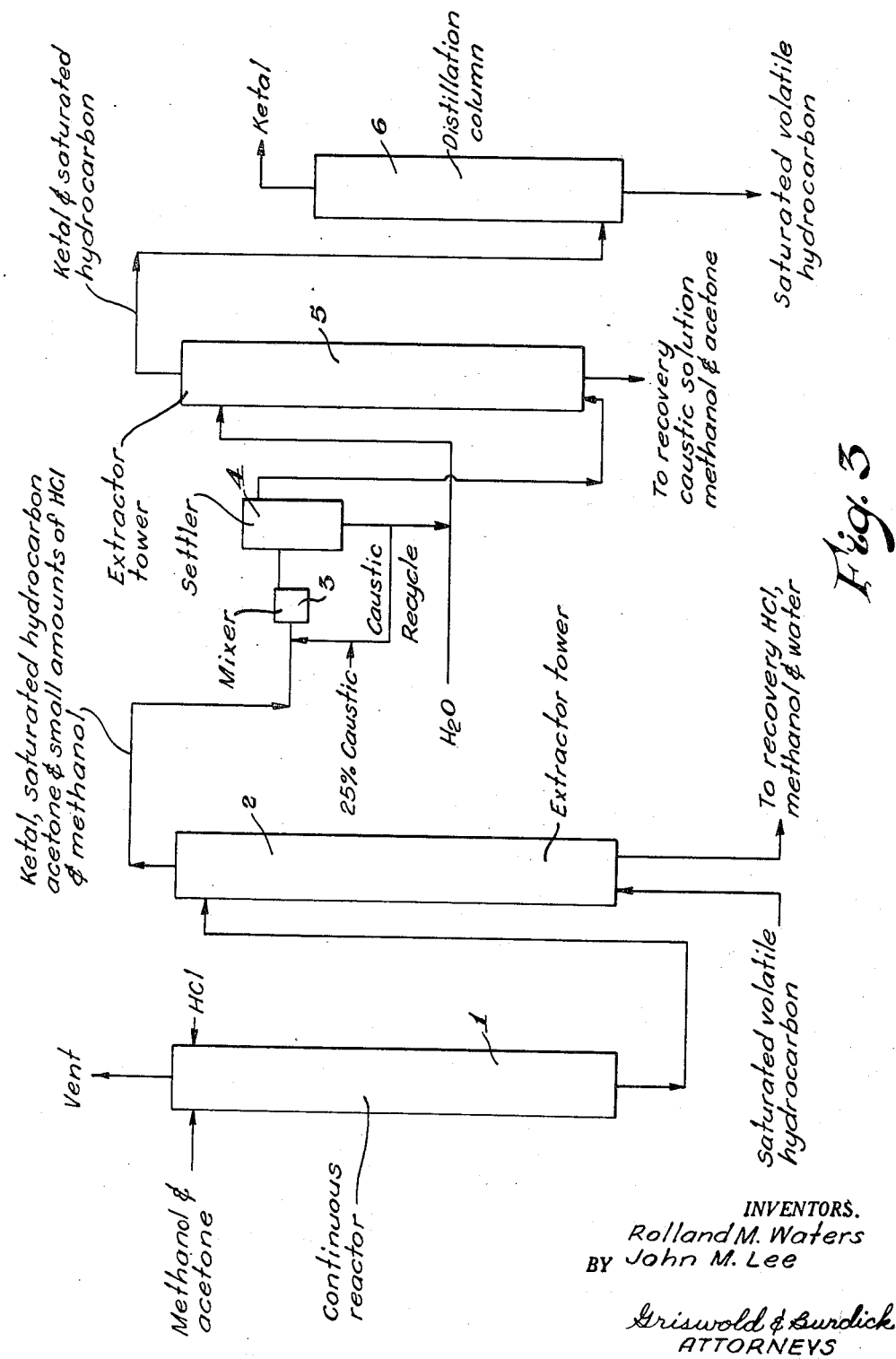

United States Patent Office 2,837,575
Patented June 3, 1958

2,837,575
PREPARATION OF KETALS

Rolland M. Waters, Freeport, and John M. Lee, Lake Jackson, Tex., assignors to The Dow Chemical Company, Midland, Mich., a corporation of Delaware Application April 23, 1956, Serial No. 579,943

19 Claims. (Cl. 260—615)

This invention relates to an improved process for preparation of ketals and more particularly, pertains to preparation of a lower ketal by the condensation reaction of an alcohol and a ketone in presence of an acid.

The condensation reaction of alcohols and aldehydes in the formation of acetals is well known. While in many respects the reactivity of the aldehydes and ketones are similar due to the presence of the carbonyl group in the molecule of each of the compounds, the formation of a ketal by the condensation reaction of an alcohol and a ketone in commercially practical amounts has not heretofore been successful. In the reaction of an alcohol and a ketone, the acid catalyst which effects the reaction is also a catalyst for the reverse reaction. In acid catalyzed reactions shown in the prior art, an equilibrium between the forward reaction forming the ketal and the reverse reaction hydrolyzing the ketal was established whereby the amount of ketal obtained in the reacting mixture was very small. Due to the inability to obtain ketal in commercially practical amounts by direct reaction of alcohols and ketones, the preparation of the ketals has been limited to costly methods using hard to obtain and expensive raw materials, such as the reaction of alcohols with acetylenes or the reaction of ketones with orthoformates. Recently, the use of lower ketals as additives in gasoline has created a considerable demand for these compounds. To take advantage of this new market, the ketals must be manufactured cheaply in order to compete with the other gasoline additives. The old methods are too expensive to be competitive.

The term "lower ketal," as used herein, refers to ketals formed by the reaction of methanol or ethanol with acetone or methylethyl ketone.

It is, therefore, the principal object of this invention to provide a process wherein the lower ketals can be prepared in practical quantities by direct reaction of an alcohol and a ketone which are readily available and inexpensive raw materials. Another object is to provide a process in which the lower ketal formed by the direct reaction of an alcohol and a ketone can be easily recovered from the reaction products.

Figure 1:
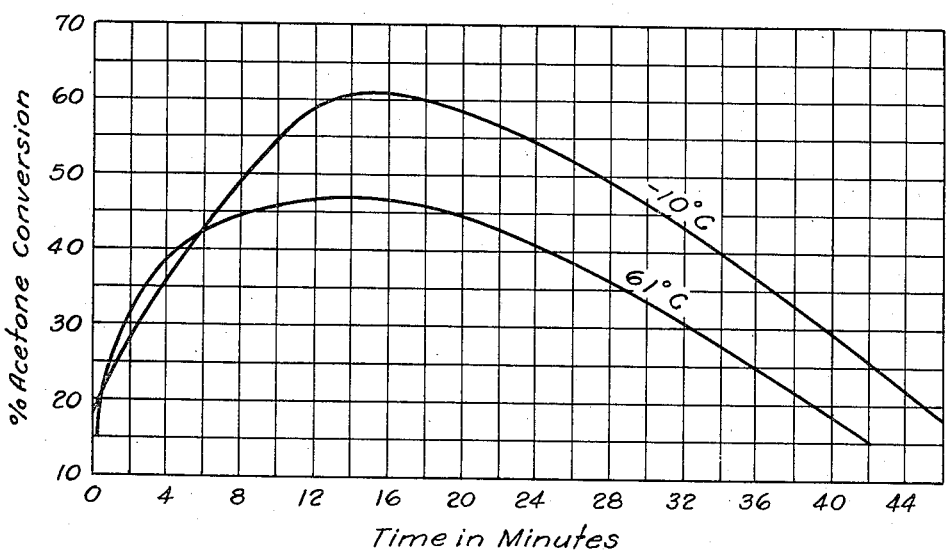
Figure 2:
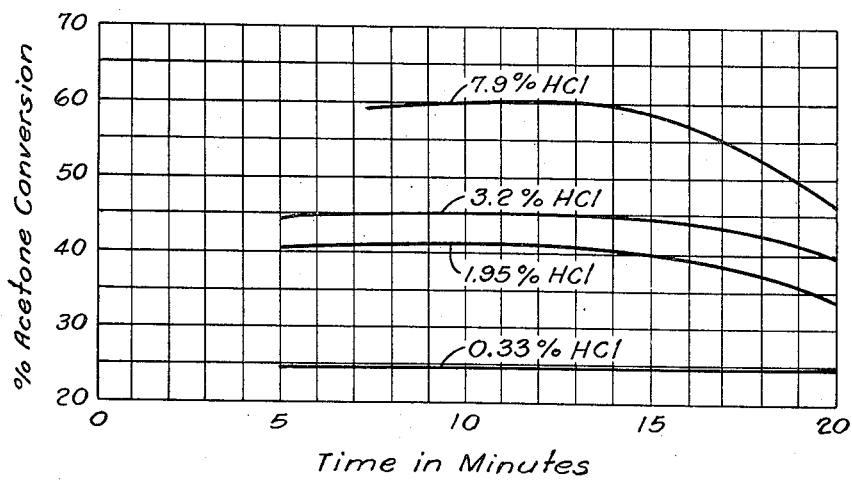

Other objects and advantages will be apparent from the following description taken in connection with the accompanying drawings in which:

Figure 1 is a graph plotting percent conversion of acetone against the time of reaction during which the acid is added continuously, Figure 2 is a graph plotting the percent conversion of acetone against the time of reaction for the reactions involving different amounts of acid, and Figure 3 is a diagrammatic flow sheet showing a continuous process for the formation and recovery of the lower ketal.

The above and other objects can be accomplished by the improved process which comprises reacting a saturated alcohol having from 1 to 2 carbon atoms and a saturated aliphatic ketone having from 3 to 4 carbon atoms in the presence of an acid selected from the group consisting of sulfuric acid and halogen acids where the acid is added in anhydrous form and in a proportion such that the reacting mass will contain from 2 to 20 weight percent acid.

It has been discovered that when a relatively large amount of acid is used in the reaction of an alcohol and a ketone, a major part of the ketone can be converted to a lower ketal, as contrasted with the extremely minor amounts of lower ketal formed when small amounts of acid are used as a catalyst in accordance with prior art teaching. This effect is illustrated in Figure 1 wherein the abscissa represents reaction time in minutes, the ordinate the percent of the acetone in the reaction mixture converted to ketal, and the curves show the conversion of acetone obtained at the reaction temperatures of −10° C. and 61° C. The details of the tests and data upon which Figure 1 is based are set forth in Example 1 below. It will be noted that the conversion of acetone to ketal increased with the acid addition to a certain point and then decreased as more acid was added. A higher conversion of acetone was obtained at −10° C. than at 61° C. but the same characteristic maximum conversion was obtained at about from 6 to 12 percent acid concentration.

No explanation of this unusual effect of acid concentration is known. However, it is probable that the formation of the lower ketal may result from more than one reaction, the conventional hydrogen-ion catalyzed reaction, and other reactions in which the acid plays a role other than one of strict catalysis, such as the formation of intermediates which are converted to the ketal. Thus, the combined rates of the reactions forming the ketal exceed the rate of the reverse reaction resulting in much greater ketal production than when the acid acts only as a catalyst. When the acid concentration in the mixture is increased to a point above 20 weight percent, it appears that the acid reacts in some manner with the constituents appreciably decreasing the yields of the lower ketals.

Figure 2 shows the effect of the acid concentration when all of the acid is added initially. In Figure 2, the abscissa represents the reaction time in minutes, the ordinate the percent of acetone in the reaction mixture converted to ketal, and the curves represent reactions using different amounts of acid. The tests and data upon which the Figure 2 is based are set forth in Example II below. It is apparent from the curves in Figure 2 that the percent conversion of acetone obtained increases as the amount of acid is is increased. When the mixture contained 0.33 weight percent HCl approximately 25 percent conversion of acetone was obtained. At higher acid percentages much greater conversions were realized. All of the data in Figure 2 were obtained at a reaction temperature of 61° C. It will be noted that a "peak" effect was obtained at this high temperature for the higher acid concentration mixtures. At the acid concentration of 0.33 weight percent the conversion was substantially constant with respect to time of reaction. When the amount of acid was increased to 1.95 percent, a 40 percent conversion was obtained in reaction time of 5 minutes which decreased to about 34 percent when the mixture was allowed to react for 20 minutes. A more pronounced maximum conversion was realized when the acid concentration was 7.9 weight percent. At lower reaction temperatures the peaks became broader and at temperatures close to 10° C., no decrease in conversion is obtained even though the reaction is allowed to proceed for considerable periods of time.

It is apparent from Figure 1 that lower temperatures favor the ketal formation. However, since refrigeration is expensive, it is preferred to operate at temperatures from −10° C. to 30° C., even though higher conversions would be realized if the reaction temperatures were lowered to about —40° C. or to a temperature where the mixture is in the liquid phase near the freezing point. Temperatures up to the reflux temperature of the mixture may be used, but at the high temperatures the reaction time becomes critical. The reaction must be stopped when a substantially maximum conversion of the ketone to ketal has been obtained, since the conversion will decrease if the reaction is allowed to proceed for longer periods of time. Generally substantial conversion of the ketone to ketal may be attained in a relatively short reaction time of a few seconds to 15 minutes depending upon the reaction temperature and acid concentration employed. For the preferred temperatures, a reaction time of 1 to 5 minutes is usually used.

In the reaction, acid concentrations ranging from 2 to 20 weight percent may be used to obtain the unusual increase in the lower ketal formation. An acid concentration from 6 to 12 weight percent is preferred for reactions in which the ketone is acetone and from 6 to 14 weight percent for reactions with methylethyl ketone. The yields of the lower ketals generally are not further increased by using acid concentrations above the preferred ranges. The unusual increase in ketal formation may also be obtained with acids other than HCl. Acids, such as $H_2SO_4$, HBr, HI and HF may be used. The hydrogen halides are by far superior with hydrogen chloride being the most effective.

Since the presence of water will increase the rate of the reverse reaction, it is desirable to maintain the water concentration in the reaction mixture at a minimum. The reaction forming the ketal will produce water so that the presence of water may not be eliminated. To minimize the water, it is essential to initiate the reaction in the substantial absence thereof. Anhydrous acids are used. The term "anhydrous acids," as used herein, means acids containing less than 0.5 percent of water by weight.

The relative proportions of alcohol and ketone used are not critical. It is preferred to use from 4 to 8 moles of alcohol per mole of ketone, though a molar ratio of alcohol to ketone used may be in the range from 2:1 to 20:1. A stoichiometric excess of ketone is not desirable as it would promote condensation reactions of the ketones. Excess of alcohol greater than the mole ratio of 20:1 is likewise not desirable as it will require the handling of a large amount of alcohol during the recovery of the product.

When a relatively high concentration of acid is maintained in the reaction mixture, high conversion of the ketone to ketal is obtained. At lower temperatures the reaction mixture can be maintained for considerable periods of time without decreasing the conversion of the ketone. However, in a particular mixture when the acid concentration is decreased, as by neutralization of part of the acid, the conversion of the ketone very rapidly drops down to the conversions expected with small amounts of acid. This effect makes the recovery of the ketal from the reacted mixture difficult, since the presence of small amounts of acid in the product will hydrolyze it. Also, this result further indicates that the formation of the ketal in the reaction is probably due to more than just the catalytic effect of the acid.

The separation of the lower ketal from the reaction mixture may be accomplished by contacting the mixture with a saturated volatile hydrocarbon in amounts from 2 to 5 times the volume of said mixture to extract the ketal. To facilitate the separation of the volatile hydrocarbon from the ketal, the saturated volatile hydrocarbon employed should have a boiling point range which is either above or below the boiling point of the ketal. For example, the saturated volatile hydrocarbon used for separation of 2,2-dimethoxypropane, which has a boiling point around 80° C., may be a petroleum ether having a boiling point range in the range of 25° to 65° C. or a hydrocarbon having a boiling range in the range of 100° to 175° C. Substantially all of the ketal, a major portion of the unreacted ketone, and small amounts of the alcohol and acid will be extracted and will be in the hydrocarbon or extract phase. The raffinate phase will contain the remainder of the unreacted ketone and most of the alcohol and acid. The hydrocarbon phase may be further processed to neutralize the acid and to remove substantially all of the alcohol and most of the ketone and then distilled to separate the ketal from the volatile hydrocarbon. In order to recover the ketal by distillation, essentially all of the alcohol and most of the ketone must be removed or azeotropes will be formed which will prevent the separation.

The acid in the hydrocarbon phase may be neutralized by contacting the hydrocarbon phase with a strongly basic compound, such as metal hydroxides, metal carbonates, basic ammonium compounds, and strongly basic ion exchange resins. It is essential to immediately neutralize the acid or the ketal will hydrolyze. Concentrated solutions of sodium hydroxide or potassium hydroxide containing from 18 to 30 weight percent of the hydroxide may be preferably employed. The amount of hydroxide utilized is small; however, it is advantageous to contact the hydrocarbon phase with considerable quantity of the hydroxide so that a good contact can be obtained and the acid rapidly neutralized. When dilute solutions or weakly basic compounds are used, the acid may not be removed quickly enough to keep part of the ketal from hydrolyzing.

The ketone and the alcohol in the neutralized hydrocarbon phase can be substantially removed by contacting the phase with a dilute sodium or potassium hydroxide solution. While a concentrated hydroxide solution will extract substantially all of the alcohol, it will not remove the ketone. By contacting the neutralized hydrocarbon phase with a dilute solution containing from 1 to 5 weight percent of the hydroxide, very little of the ketal is lost and essentially all of the ketone is removed or its concentration reduced to the extent that the final separation of the ketal, the ketone, and the volatile hydrocarbon may be made by distillation. In the extraction it is advantageous to use relatively small volumetric amounts of the dilute hydroxide solution with respect to the volume of the neutralized hydrocarbon phase and to use from 3 to 5 ideal extract stages. The volumetric ratio of the dilute hydroxide solution to the neutralized hydrocarbon phase which is generally employed is in the range of 1:2 to 1:10. When the ketone and the alcohol have been substantially removed, the lower ketal may be distilled from the volatile hydrocarbon and the hydrocarbon reused.

The unreacted ketone and alcohol in the raffinate phase also may be recovered and reused. The recovery may be conveniently accomplished by distillation of the mixture after the acid in the raffinate has been neutralized to prevent its reaction with the alcohol or ketone at the distillation temperatures.

In the separation process the use of the hydroxide in the neutralization of the hydrocarbon phase and the extraction of the alcohol and ketone may be advantageously combined. Enough hydroxide to neutralize the acid in the raffinate may be used in the concentrated form to neutralize the acid in the hydrocarbon phase. After neutralizing the small amounts of acid in the hydrocarbon phase, the hydroxide may be diluted with water to obtain the desired concentration and may then be used to extract the alcohol and ketone from the neutralized phase. Then the hydroxide may be added to the raffinate to neutralize the acid in the raffinate and the resultant mixture distilled to recover the alcohol and ketone.

It is evident to a person skilled in the art that the principles of the invention may be applied in different ways. A batch process may be used where all of the acid is added to the reactants and the mixture reacted for the required time, or the acid may be continuously added to the reactants at a set rate while the reaction is proceeding. To obtain the advantages of a continuous operation, a continuous process where the acid and the reactants are fed to the reactor at a set rate is preferred. In a continuous process the reactor may be operated in conjunction with a ketal recovery unit. The time of reaction can be readily controlled for the particular arrangement by adjusting the rates.

A continuous process for preparation and recovery of 2,2-dimethoxypropane embodying the invention is diagrammatically shown in Figure 3. A mixture containing from 4 to 8 moles of alcohol per mole of acetone is continuously fed into a jacketed reactor 1. Anhydrous hydrogen chloride is separately introduced into the reactor at a rate such that the reacting mixture will contain from 6 to 12 weight percent of the acid. The rates are adjusted to obtain the desired reaction time. In the reactor the acid, the alcohol, and the ketone are mixed by mechanical mixers. The temperature of the reactants is maintained at a temperature from $-10°$ to $30°$ C. by circulation of a coolant in the jacket of the reactor. The effluent from reactor 1 is introduced into the top of extraction tower 2 where it is contacted with a saturated volatile hydrocarbon which is introduced at the bottom of the tower in amounts from 2 to 5 times the volume of the reactor effluent. The hydrocarbon phase, or the extract phase, being continuously withdrawn from the top of the extraction tower 2 and containing the ketal, acetone, and small amounts of methanol and HCl, is passed to pump mixer 3 where it is contacted with concentrated sodium hydroxide solution for ½ to 1 minute. Sufficient amount of 25 weight percent caustic is added to pump mixer 3 to neutralize all of the acid both in the extract and the raffinate phases coming from extraction tower 2. Some recycled caustic from settler 4 may be combined with the fresh caustic to obtain a better contact to rapidly and thoroughly neutralize the acid in the hydrocarbon phase. From the mixer the constituents are passed to the settler 4 where the neutralized hydrocarbon phase is separated from the caustic. The neutralized hydrocarbon phase from settler 4 is passed to the top of extraction tower 5 where the acetone and the methanol are removed by contacting the neutralized phase with a caustic solution containing from 1 to 5 weight percent caustic which is obtained by withdrawing and diluting part of the caustic layer from settler 4. The hydrocarbon phase from tower 5 is distilled in distillation column 6 to separate the ketal from the volatile hydrocarbon. The caustic solution from extraction tower 5, is combined with the raffinate from extraction tower 2 to neutralize the acid and then the mixture may be distilled to recover the unreacted ketone and methanol.

It is apparent to a person skilled in the art that the above embodiment of the invention may be modified. In the reactor the mechanical mixers may be replaced by other means for mixing the reactants, such as packing. Mixer-settlers may replace the extraction towers 2 and 5 and other means may be adapted to rapidly neutralize the acid in the hydrocarbon phase.

The invention is further illustrated by the following examples.

*Example I*

To a 500 ml. 3-neck reaction flask, 6.0 gram moles of methanol and 1.5 gram moles of acetone were added. The mixture was refluxed at a temperature of $61°$ C. Anhydrous HCl was introduced into the mixture at a substantially constant rate through a gas-dispersion stirrer while the reactants were stirred. Samples were removed at different intervals, immediately frozen to $-60°$ C. to stop the reaction, and later analyzed for acetone conversion by infrared absorptiometry. The results obtained are indicated in the table below and are plotted in Figure 1.

| Time After Addition of HCl Started, Minutes | Percent Conversion of Acetone | Weight Percent of HCl in Mixture |
|---|---|---|
| 1 | 26.6 | 0.66 |
| 2 | 30.9 | 1.35 |
| 3 | 36.6 | 1.94 |
| 4 | 41.3 | 2.58 |
| 10 | 45.9 | 6.23 |
| 20 | 46.5 | 11.7 |
| 30 | 32.2 | 16.6 |
| 40 | 18.1 | 21.0 |

The above run was repeated at $-10°$ C. except that a 1 liter 3-neck flask was used and the amounts of the reactants used were twice the amounts above. The results obtained are indicated in the table below and are plotted in Figure 1.

| Time After Addition of HCl Started, Minutes | Percent Conversion of Acetone | Weight Percent of HCl in Mixture |
|---|---|---|
| 0.5 | 22.6 | 0.33 |
| 1 | 25.3 | 0.52 |
| 2 | 25.8 | 1.86 |
| 3 | 33.7 | 2.49 |
| 4 | 38.0 | 3.15 |
| 5 | 40.7 | 3.78 |
| 6 | 40.3 | 4.42 |
| 7 | 43.7 | 5.06 |
| 8 | 45.9 | 5.69 |
| 9 | 48.6 | 5.69 |
| 10 | 50.9 | 6.11 |
| 11 | 56.3 | 6.90 |
| 12 | 57.9 | 7.34 |
| 13 | 67.2 | 8.00 |
| 14 | 63.3 | 8.66 |
| 16 | 55.7 | 9.93 |
| 20 | 55.9 | 12.28 |
| 25 | 54.3 | 15.04 |
| 35 | 38.7 | 20.18 |
| 45 | 22.8 | |
| 60 | 6.56 | 26.25 |
| 80 | 1.38 | 36.5 |
| 110 | 0.9 | 36.8 |
| 140 | 0.8 | 37.5 |
| 170 | 0.7 | 36.2 |

*Example II*

A series of runs were made where a mixture of methanol and acetone containing substantially a molar ratio of 4 moles of methanol per mole of acetone was reacted in the presence of different amounts of acid.

A stock solution of anhydrous HCl and anhydrous methanol was prepared which contained 26 weight percent of HCl. The acetone and the methanol were added to a 500 ml. 3-neck flask in the amounts of 110 ml. of acetone and 115 ml. of methanol. The mixture was heated to the reflux temperature and then a given amount of the stock solution of methanol and HCl was added through the reflux condenser. After addition of the stock solution samples were withdrawn every five minutes, immediately frozen to $-60°$ C., and later analyzed by infrared absorptiometry. The acid concentration of the reaction mixture was determined by titration.

The results obtained are indicated in the following table and are plotted in Figure 2.

| Acid in Mixture, Weight Percent | Percent Conversion of Acetone | | | |
|---|---|---|---|---|
| | 5 Min. | 10 Min. | 15 Min. | 20 Min. |
| 0.33 | 24.8 | 24.8 | 24.8 | 24.8 |
| 1.95 | 40.1 | 39.0 | 46.1 | 33.7 |
| 3.20 | 44.3 | 44.3 | 42.6 | 39.1 |
| 7.9 | | 58.5 | 58.5 | 44.3 |

*Example III*

A reaction flask containing 12 moles of methanol was chilled to $-10°$ C. Anhydrous HCl was passed into the methanol until an acid concentration of approximately 8 weight percent was obtained. Three moles of acetone, previously chilled to −10° C., was quickly added to this methanol-HCl solution. Samples were withdrawn at intervals and analyzed by infrared absorptiometry to determine the acetone conversion. The acid concentration of the reaction mixture was determined by titration and found to contain 7.48 weight percent. The results obtained are shown below.

| Time of Reaction, Minutes | Percent Conversion of Acetone |
|---|---|
| 0.75 | 63.3 |
| 5.0 | 60.9 |
| 10.0 | 61.6 |
| 13.0 | 66.5 |
| 45.0 | 62.2 |
| 82.0 | 63.1 |

Another run similar to above was made except that the acid concentration in the reaction mixture was increased to 33.4 percent. The results obtained are shown below.

| Time of Reaction, Minutes | Percent Conversion of Acetone |
|---|---|
| 8 | 3.64 |
| 60 | 4.5 |

Example IV

A run was made where a mixture of methanol and acetone having a molar ratio of 4 moles of methanol per mole of acetone was reacted in the presence of $H_2SO_4$.

A mixture of methanol and acetone containing 115 ml. of methanol and 110 ml. of acetone was placed into a 500 ml. 3-neck flask. A sulfuric acid mixture containing 25.3 weight percent acid and 74.7 weight percent methanol was added to the mixture in the amount of 138 ml. The resulting acid concentration in the reaction mixture was 11 weight percent. The reaction temperature was 25° C. Samples were withdrawn at 1, 5, and 10 minutes after the acid was added and analyzed for weight percent 2,2-dimethoxypropane by infrared absorptiometry. The 1, 5, and 10 minute samples contained: 13, 24, and 19 weight percent of 2,2-dimethoxypropane, respectively.

Example V

A run was made where a mixture of methanol and methylethyl ketone having a molar ratio of 4 moles of methanol per mole of the ketone was reacted in the presence of HCl at 25° C.

A mixture containing 102 ml. of methanol and 134.5 ml. of methylethyl ketone was placed in a 500 ml. 3-neck flask. A stock solution of HCl and methanol containing 29.4 gm. of HCl per 100 ml. of the solution was added in the amount of 101 ml. Samples were withdrawn at 1, 7, 15, and 20 minutes after the acid addition. The samples were analyzed as in other examples and found to contain 23, 29, 23, and 31 percent by weight of 2,2-dimethoxybutane, respectively.

Example VI

A run was made where a mixture of ethanol and acetone having a molar ratio of 4 moles of ethanol per mole of ketone was reacted in the presence of HCl at 25° C.

A mixture containing 126 ml. of ethanol and 110 ml. of acetone was placed in a 500 ml. 3-neck flask. A stock solution of HCl and ethanol containing 28.9 gm. of HCl per 100 ml. of the solution was added in the amount of 125 ml. Samples were withdrawn at 1, 3, 7, and 15 minutes after the acid addition. The samples were analyzed as in other examples and found to contain 25, 27, 26, and 27 weight percent of 2,2-diethoxypropane, respectively.

Example VII

Two series of runs were made to determine the optimum caustic concentration for the extraction of acetone from a mixture containing a hydrocarbon solvent, methanol, acetone and 2,2-dimethoxypropane. A stock solution was made up by adding known amounts of the constituents to a saturated volatile hydrocarbon having a boiling range of 130° to 170° C. In the first series of runs the solution made contained 2.5 grams of methanol, 2.4 grams of acetone, and 4.4 grams of 2,2-dimethoxypropane per 100 ml. In the second series of runs the stock solution contained 2.0 grams of methanol, 2.8 grams of acetone, and 4.0 grams of 2,2-dimethoxypropane per 100 ml. The stock solution in amounts of 100 ml. was contacted with different concentrations and amounts of aqueous caustic solution. A one ml. sample of the resulting extracted solution was analyzed by infrared absorptiometry to determine the remaining amount of methanol, acetone, and 2,2-dimethoxypropane. From the results, the grams of methanol, acetone, and ketal in 100 ml. of the extracted solution was calculated. The results obtained are indicated below.

| Caustic Conc., Weight Percent | Volume Ratio, Stock Solution/ Caustic | Grams per 100 ml. of Extracted Solution | | |
|---|---|---|---|---|
| | | Methanol | Acetone | Ketal |
| First Series: | | | | |
| 5 | 5/1 | Trace | 1.3 | 4.5 |
| 15 | 5/1 | do | 2.2 | 4.5 |
| 25 | 5/1 | do | 2.2 | 4.6 |
| 5 | 10/1 | do | 1.5 | 4.5 |
| 15 | 10/1 | do | 2.2 | 4.7 |
| 25 | 10/1 | do | 2.4 | 4.9 |
| Second Series: | | | | |
| 0.1 | 5/1 | do | 0.9 | 3.5 |
| 1.0 | 5/1 | do | 0.9 | 4.0 |

Example VIII

A pilot plant essentially as illustrated diagrammatically in Figure 3 was operated for over 28 hours on stream in the production of 2,2-dimethoxypropane by the reaction of methanol and acetone in the presence of HCl at 30° C.

Methanol and acetone were mixed together in amounts such that a mixture containing a molar ratio of 6 moles of methanol per one mole of acetone was obtained. This mixture was fed to the reactor equipped with a mechanical mixer at a rate of 10 ml. per minute. Anhydrous HCl was introduced into the reactor at a rate of 45 gms. per hour which resulted in obtaining a mixture in the reactor containing around 8.6 weight percent of HCl. A reaction time of 4.5 minutes in the reactor was provided. The effluent from the reactor was contacted in an extraction tower packed with glass helices with saturated volatile hydrocarbon having a boiling range of 130° to 170° C. The amount of the hydrocarbon metered to the extraction was approximately 4 times the volume of the effluent coming from the reactor. The reactor and the extraction tower were jacketed and water was circulated to control the temperature. The temperature in the extraction tower was approximately 27° C. An aqueous solution containing 25 weight percent caustic was fed to a pump mixer and settler combination at a rate of around 242 gms. of solution per hour. Some of the caustic from the settler was recycled so that the resultant caustic concentration in the pump mixer was 22 weight percent caustic. After the HCl in the hydrocarbon phase from the extraction was neutralized, the neutralized hydrocarbon phase was contacted with a 2.3 weight percent caustic solution in a countercurrent 4-stage mixer-settler extraction unit. The amount of the dilute caustic solution used was about 0.56 of the volume of the neutralized hydrocarbon phase. The dilute caustic solution was obtained by diluting with water part of the caustic withdrawn from the neutralizer settler. The hydrocarbon phase from the mixer-settler extraction unit was distilled to separate the hydrocarbon solvent from the 2,2-dimethoxypropane. The dilute caustic from the mixer-settler extractor was combined with the raffinate from the hydrocarbon solvent extraction tower to neutralize the HCl in the raffinate, and the mixture distilled to recover the unreacted methanol and acetone.

In the run, 2,960 gms. of acetone, 9,800 gms. of methanol, and 1,290 gms. of anhydrous HCl were fed to the reactor. The ketal product obtained contained 2,613 gms. of 2,2-dimethoxypropane and 84 gms. of acetone. The unreacted methanol and acetone recovered amounted to 1,436 gms. of acetone and 8,135 gms. of methanol. The recovered ketal represented a 49.3 percent conversion of the acetone. With the recovered acetone, an acetone efficiency of 97 percent was obtained.

What is claimed is:

1. A process for preparation of a lower ketal by the reaction of an alcohol with a ketone, which comprises the step of reacting an unsubstituted saturated monohydric alcohol having from 1 to 2 carbon atoms and an unsubstituted saturated aliphatic ketone having from 3 to 4 carbon atoms in the presence of an acid selected from the group consisting of sulfuric acid and halogen acids and in an amount equal to 2 to 20 weight percent of the reacting mass, the reaction being initiated in the substantial absence of water.

2. A process for preparation of a lower ketal by the reaction of an alcohol and a ketone, which comprises intermixing an unsubstituted saturated monohydric alcohol having from 1 to 2 carbon atoms, an unsubstituted saturated aliphatic ketone having from 3 to 4 carbon atoms, and an anhydrous acid selected from the group consisting of sulfuric acid and halogen acids in proportions such that the mixture will contain from 2 to 20 weight percent acid, reacting the mixture in the liquid phase at a temperature up to and including the reflux temperature of the mixture for a length of time sufficient to obtain substantial conversion of the reactants to the corresponding ketal, and recovering the ketal.

3. A process according to claim 2, wherein the ketone is acetone.

4. A process according to claim 2, wherein the ketone is methylethyl ketone.

5. A process according to claim 2, wherein the acid is anhydrous halogen acid.

6. A process according to claim 5, wherein the halogen acid is hydrogen chloride.

7. A process according to claim 5, wherein the halogen acid is hydrogen bromide.

8. A process according to claim 5, wherein the halogen acid is hydrogen iodide.

9. A process according to claim 5, wherein the halogen acid is hydrogen fluoride.

10. A process according to claim 2, wherein the acid is anhydrous $H_2SO_4$.

11. A process for preparation of 2,2-dimethoxypropane, which comprises intermixing methanol and acetone in a ratio of 2 to 20 moles of the alcohol for every mole of the ketone, adding anhydrous HCl to the mixture until the concentration of the acid is in the range of 2 to 20 weight percent of the total mixture, reacting the constituents in a liquid phase at a temperature up to and including the reflux temperature of the mixture for a length of time sufficient to obtain substantial conversion of the reactants to 2,2-dimethoxypropane, and recovering the 2,2-dimethoxypropane formed.

12. A process for preparation of 2,2-dimethoxypropane, which comprises intermixing methanol and acetone in a ratio of 4 to 8 moles of the alcohol per mole of the ketone, adding anhydrous HCl to the mixture until the acid concentration is in the range of 6 to 12 weight percent, reacting the constituents at a temperature ranging from −10° C. to 30° C. for a length of time of 1 to 5 minutes, and recovering the 2,2-dimethoxypropane formed.

13. A process for preparation of 2,2-dimethoxybutane, which comprises intermixing methanol and methylethyl ketone in a ratio of 4 to 8 moles of the alcohol per mole of the ketone, adding anhydrous HCl to the mixture until the acid concentration is in the range of 6 to 14 weight percent, reacting the constituents at a temperature ranging from −10° C. to 30° C. for a length of time of 1 to 5 minutes, and recovering the 2,2-dimethoxybutane formed.

14. A process for preparation of 2,2-diethoxypropane, which comprises intermixing ethanol and acetone in a ratio of 4 to 8 moles of the alcohol per mole of the ketone, adding anhydrous HCl to the mixture until the acid concentration is in the range of 6 to 12 weight percent, reacting the constituents at a temperature ranging from −10° C. to 30° C. for a length of time of 1 to 5 minutes, and recovering the 2,2-diethoxypropane formed.

15. A process for separation of a lower ketal from a mixture containing a saturated alcohol having from 1 to 2 carbon atoms, a saturated aliphatic ketone having from 3 to 4 carbon atoms, water, and acid, which comprises contacting said mixture with a saturated volatile hydrocarbon having a boiling point range excluding the boiling point of the ketal in amounts from 2 to 5 times the volume of said mixture to extract the ketal in a hydrocarbon phase, contacting the hydrocarbon phase with a strongly basic compound to neutralize the acid, contacting the neutralized hydrocarbon phase with an aqueous solution containing from 1 to 5 weight percent of a metal hydroxide selected from the group consisting of sodium hydroxide and potassium hydroxide, and separating the ketal from the hydrocarbon phase.

16. A process according to claim 15, wherein the strongly basic compound is sodium hydroxide in an aqueous solution containing from 18 to 30 weight percent of hydroxide.

17. A process according to claim 15, wherein the strongly basic compound is potassium hydroxide in an aqueous solution containing from 18 to 30 weight percent of potassium hydroxide.

18. A continuous process for preparation of a lower ketal by the reaction of an alcohol and a ketone where the reactants are continuously charged to a reactor and the reaction products continuously discharged in an effluent from the reactor, which comprises charging continuously to the reactor an unsubstituted saturated monohydric alcohol having from 1 to 2 carbon atoms, an unsubstituted saturated aliphatic ketone having from 3 to 4 carbon atoms, and an anhydrous acid selected from the group consisting of sulfuric acid and halogen acids in proportions such that the constituents therein will contain from 2 to 20 weight percent acid, intermixing and reacting the constituents in a liquid phase at a temperature up to and including the reflux temperature of the mixture for a length of time to obtain substantially conversion of the reactants to the corresponding ketal, extracting the ketal from the effluent of the reactor with a saturated volatile hydrocarbon having a boiling point range excluding the boiling point of the ketal in amounts from 2 to 5 times the volume of the effluent to obtain the ketal in a hydrocarbon phase, contacting the hydrocarbon phase with a strongly basic compound to neutralize the acid, contacting the neutralized hydrocarbon phase with an aqueous solution containing from 1 to 5 weight percent of a metal hydroxide selected from the group consisting of sodium hydroxide and potassium hydroxide, and separating the ketal from the hydrocarbon phase.

19. A continuous process for preparation of a 2,2-dimethoxypropane by the reaction of methanol and acetone where the reactants are continuously charged to a reactor and the products continuously discharged in an effluent from the reactor, which comprises charging continuously to the reactor the methanol and the acetone in a molar ratio from 4 to 8 moles of the alcohol per mole of acetone, and anhydrous HCl in proportions such that the constituents in the reactor will contain from 6 to 12 weight percent acid, intermixing the reacting constituents in a liquid phase therein at a temperature up to the reflux temperature of the mixture for a length of time to obtain substantial conversion of the reactants to the corresponding ketal, extracting the ketal in a hydrocarbon phase from the effluent of the reactor with a saturated volatile hydrocarbon having a boiling point range excluding the boiling point of the ketal in amounts from 2 to 5 times the volume of the effluent, contacting the hydrocarbon phase with an aqueous solution of sodium hydroxide containing from 18 to 30 weight percent of the hydroxide to neutralize the acid, separating the neutralized hydrocarbon phase from the sodium hydroxide solution, contacting the neutralized hydrocarbon phase with an aqueous solution of sodium hydroxide containing from 1 to 5 weight percent of the hydroxide, and separating the 2,2,-dimethoxypropane from the hydrocarbon phase.

References Cited in the file of this patent

Adams et al.: Jour. Amer. Chem. Soc., vol. 47 (1925), pp. 1358–1367.

Brewster: Organic Chemistry (1948), p. 136.

Karrer: Organic Chemistry (1950), p. 174.

Fieser et al.: Organic Chemistry (1950), p. 217.